United States Patent [19]

Jungnell et al.

[11] Patent Number: 4,648,619

[45] Date of Patent: Mar. 10, 1987

[54] COLLAPSIBLE WHEELCHAIR CHASSIS

[75] Inventors: Jarl O. Jungnell, Vällingby; Bo P. Sköld, Spåanga, both of Sweden

[73] Assignee: Molnlycke AB, Gothenburg, Sweden

[21] Appl. No.: 783,440

[22] Filed: Oct. 3, 1985

[30] Foreign Application Priority Data

Mar. 8, 1985 [SE] Sweden ................................ 8501159

[51] Int. Cl.[4] ................................................ B62B 3/02

[52] U.S. Cl. ............................ 280/650; 280/242 WC; 280/657; 297/379; 403/85; 403/91

[58] Field of Search ................. 280/650, 657, 647, 42, 280/242 WC, 289 WC; 297/378, 379, 42, 44, 45; 403/85, 80, 63, 91

[56] References Cited

U.S. PATENT DOCUMENTS

| | | | |
|---|---|---|---|
| 2,669,289 | 2/1954 | Usher et al. | 280/42 X |
| 2,713,891 | 7/1955 | Linquist | 297/379 |
| 4,101,143 | 7/1978 | Sieber | 280/650 |
| 4,371,183 | 2/1983 | Dion | 280/42 |
| 4,415,177 | 11/1983 | Hale et al. | 280/650 |

FOREIGN PATENT DOCUMENTS

| | | | |
|---|---|---|---|
| 0026510 | 4/1981 | European Pat. Off. | 414/921 |
| 3239472 | 5/1983 | Fed. Rep. of Germany | 280/650 |
| WO85/01873 | 5/1985 | PCT Int'l Appl. | 280/650 |

*Primary Examiner*—John J. Love
*Assistant Examiner*—Eric D. Culbreth
*Attorney, Agent, or Firm*—Young & Thompson

[57] ABSTRACT

The invention relates to a collapsible wheelchair chassis of the type including two side frames, which are jointed together by a pair of crossed braces provided with a pivot joint at their middle. According to the invention, the braces are arranged in a horizontal plane in order to obtain maximum compactness of the chassis in its collapsed state.

5 Claims, 5 Drawing Figures

COLLAPSIBLE WHEELCHAIR CHASSIS

The present invention relates to a collapsible wheelchair chassis of the type including two side frames that are joined together by a pair of crossed braces, with a pivot joint at their middle.

In a time when those confined to wheelchairs beginning to extensively engage in a more active life style, the demands on the transportability of wheelchairs have increased. Modern wheelchairs are generally provided with easily removable wheels. It is furthermore sought to make them as light and compact as possible, without relinquishing stability requirements, so that the user himself can easily lift the wheelchair into his car and place it in the vicinity of the driver's seat. Large demands are thus placed on modern wheelchairs.

To ensure vertical stability, wheelchairs are generally provided with a pair of crossed braces arranged in the vertical plane and joining the side frames together. With wheelchairs that are not collapsible, horizontal stability is ensured by transverse braces.

It is known in the art to make the wheelchair chassis collapsible, for increasing compactness in transport. It has then been quite natural to start with known structures having cross bracing arranged vertically, the crossed braces being provided with a pivot joint at their middle and their lower ends being pivotably connected to the side frames. At their upper ends the braces have been connected to the upper portions of the side frames to ensure horizontal stability.

An example of such a structure is shown in German Offenlegungsschrift No. DE-A-3 239 472, where the frame portions rigidly connected to the brace ends are slidably connected to vertical sleeve members on the side frames. In another known embodiment of such a structure, the longitudinal frame portions of the crossed brace ends are connected to the side frames by pivotable links.

The invention has the object of further increasing the compactness of a collapsible wheelchair while reducing its weight and number of parts, as well as achieving a stable collapsible structure.

This object is enabled unconventionally for a wheelchair in accordance with the invention, by having the crossed braces arranged in a horizontal plane, by the connection means being fixed to the side frames for horizontal pivotability, by one end of the braces being axially displaceably connected to the associated connection means, and by there being locking devices for locking the axial movement of this end of the braces in the erected state of the wheelchair. In this implementation, parts of the chassis do not project outside the upper parts of the side frames when the chassis is collapsed, as in known implementations of collapsible chassis.

By arranging the backrest so that it may be swung forwards, and due to the absence of such projecting parts maximum compactness is afforded. Therefore the total space requirement of the chassis will be substantially as great as the greatest included structural part (side frame).

The invention further includes locking or latching means and devices which lock the chassis and the backrest in their erected state, and which are readily operated from and to their locking or latching positions.

Other advantageous distinguishing features of the invention will be apparant from the following description of a preferred embodiment of it, illustrated by drawings, in which FIG. 1 illustrates a complete wheelchair with a chassis in accordance with the invention, in an erected state;

Figure 1:
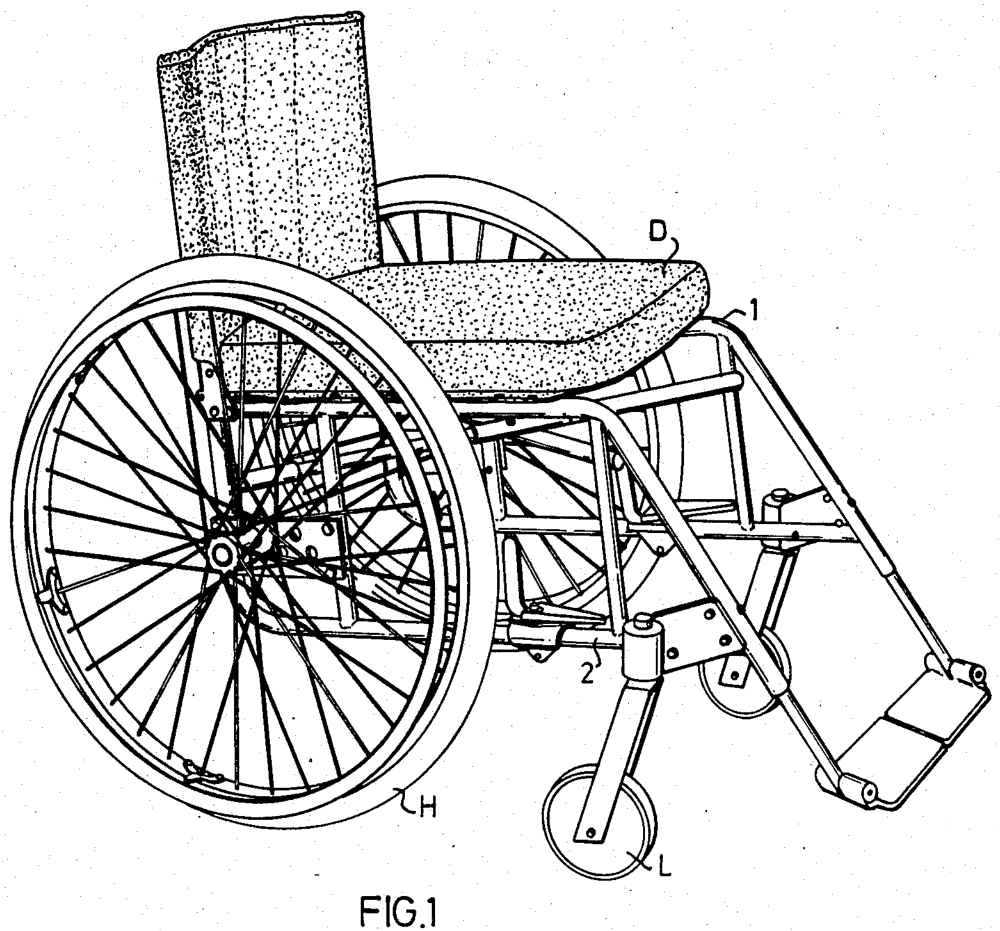
Figure 2:
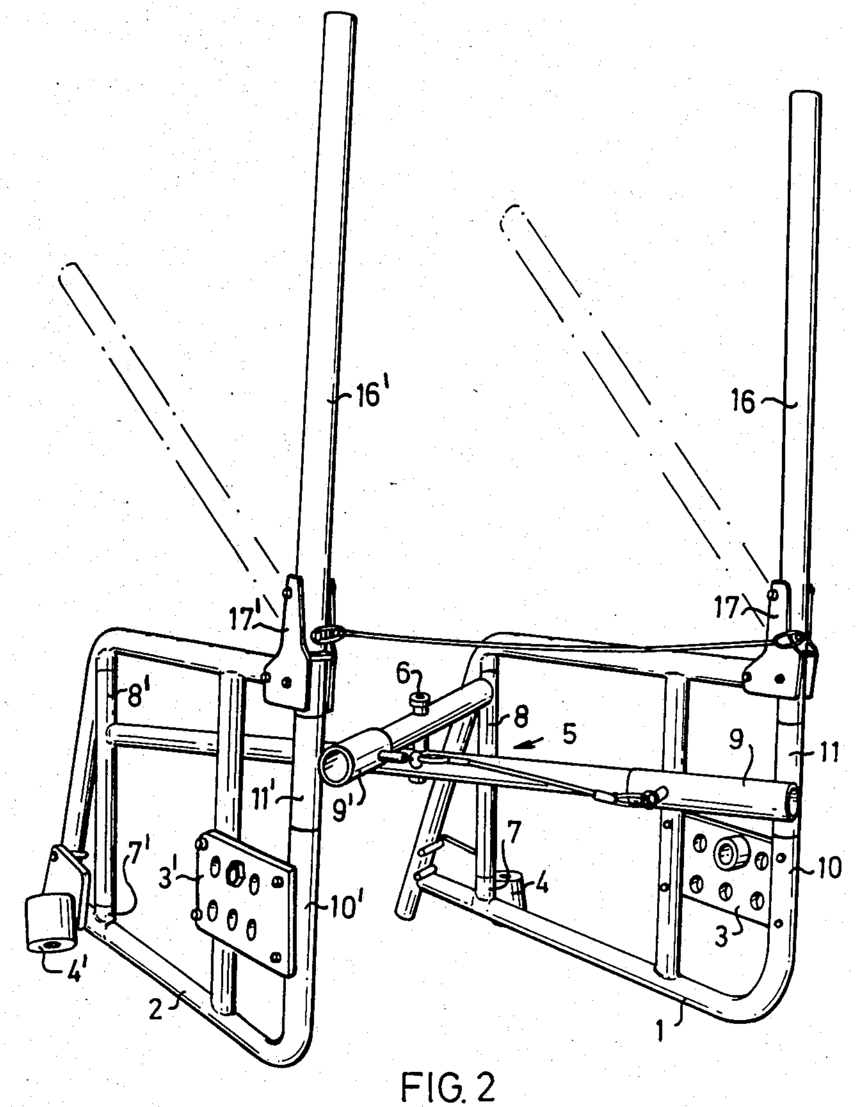
FIG. 2 is a perspective view of a chassis in accordance with the invention seen obliquely from behind.

A complete wheelchair is illustrated in FIG. 1, with drive wheels H and casters L. A seat cushion D is loosely placed on a flexible base of textile material fixed to the upper portions of the chassis side frames.

The inventive wheelchair chassis illustrated in FIGS. 2–5 includes two vertical side frames 1,2 of steel tubing, each carrying wheel and caster suspensions 3,3' and 4,4'. The side frames are joined together by a cross bracing 5, which is provided with a pivot joint 6. This joint may be a bolt going through holes formed vertically in each brace. The forward ends of the braces are rigidly connected, e.g. by welding, to axially indisplaceable sleeves 8,8' pivotably mounted on forward stubs 7,7' on the side frames. The rear ends of the braces are telescopically displaceable in horizontal guide sleeves 9,9', which are in turn rigidly connected to axially indisplaceable sleeves 11,11' pivotably mounted on stubs 10,10'.

When the chassis is collapsed, the rear ends of the braces will be displaced rearwards in the guide sleeves, which are pivotably mounted via the sleeves 11,11'. At the same time the pivot joint 6 will move rearwards relative the side frames. The lengths of the braces and the guide sleeves can be adjusted such that in the collapsed state of the chassis, the rear ends of the cross bracing do not project out past the guide sleeves, and therefore not past the contour of the side frames either. However, in FIG. 3 the rear ends of the braces are shown projecting from the rear ends of the guide sleeves so that the sliding of the braces and the structure may be better visualized.

In the erected state, each brace is locked against displacement in its guide sleeve by a locking device 12 or 12', respectively, as will be described in detail below.

In spite of the departure from the orthodox design principle of vertically placed bracing, the wheelchair chassis of the invention has excellent stability. Vertical stability is obtained in the erected, locked state of the chassis, since it may be said that the cross bracing is rigidly connected to the sleeves 8,8' and 11,11', respectively, which take up bending moment about horizontal axes. Horizontal stability is afforded by the cross bracing itself. The situation of the cross bracing illustrated may of course be varied in height to obtain changed stability properties. In the same way, the extension and stiffness of the sleeves themselves may be varied for the same purpose, as well as the relative fastening points of the cross bracing on the sleeves.

Figure 3:
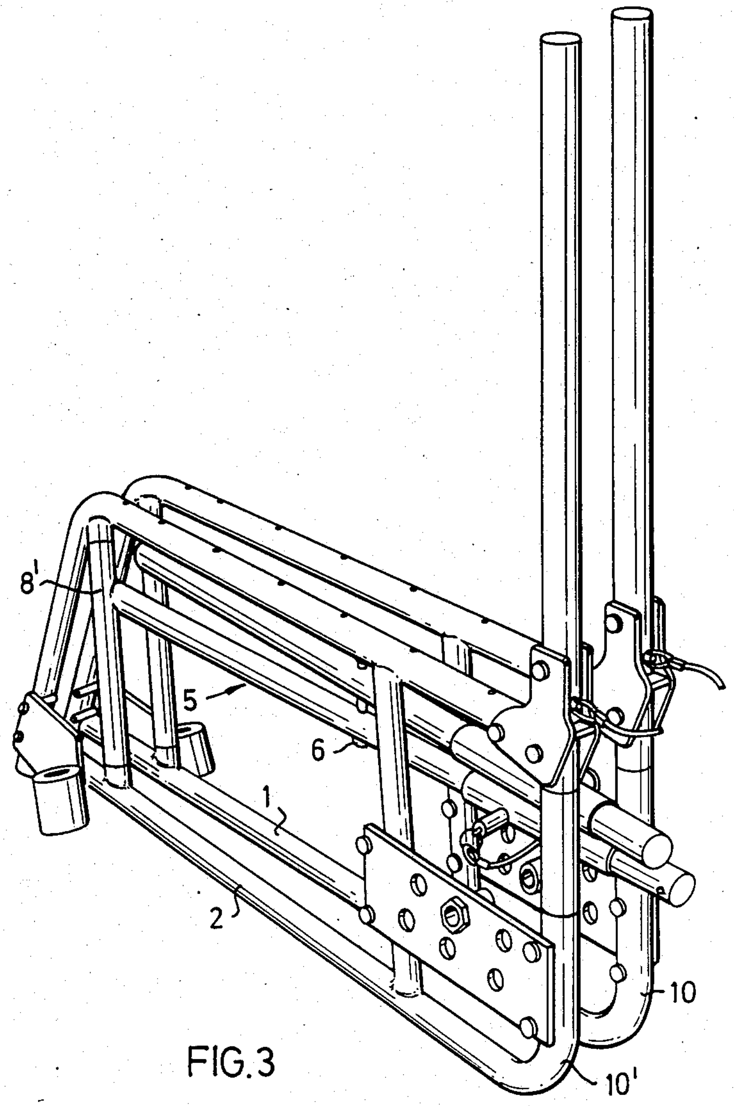
FIG. 3 is a side elevation of the chassis according to FIG. 2 in a collapsed state.
Figure 4:
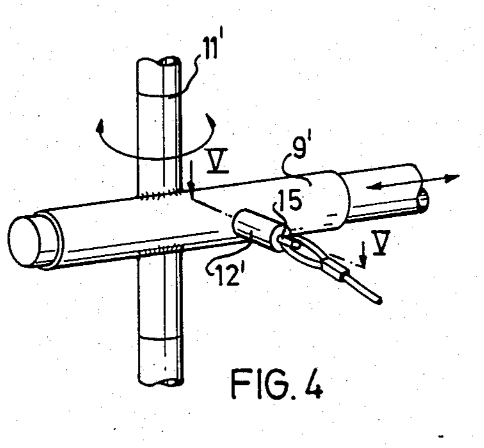
FIG. 4 is a fragmentary perspective view of the telescopic connection for the rear end of one of the crossed braces.
Figure 5:
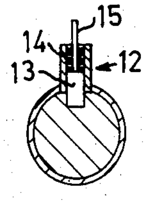
FIG. 5 is a cross section along the line V—V in FIG. 4.

The locking devices 12,12' mentioned above, which lock the rear ends of the braces against displacement in the sleeves 9,9' in the erected state of the chassis, comprise locking pins 13 biassed by springs 14 such as to enter their respective locking hole on the rear portion of the brace via the sleeve. Such a hole is shown in FIG. 3. As will be seen, particularly from FIG. 5, the locking pins are guided in tubes on the guide sleeves, the outward end of the pin being attached to a plastic-coated steel cable 15 or the like, which constitutes the operating means for taking both pins out of their locking position. Since they are spring-biassed, the pins will automatically lock the chassis in its erected state, in which the bores in the guide tubes and the holes in the braces are directly opposite each other. The locking devices 12,12' are thus automatically acting, which is important from the safety aspect.

The purpose of the implementation with the horizontal cross bracing is not only to make the unit comprising the side frames and cross bracing with maximum compactness in the collapsed state of the chassis, but also to enable in an elegant and simple way that the backrest supports 16,16' may be swung forwards without obstruction in a collapsed state from parts projecting past the upper portion of the side frames. The purpose is to achieve great stability in the position of use as well.

The supports 16,16' may thus be swung forwards in accordance with the invention. They are carried by brackets 17,17' attached to the side frames, and their downward ends are provided with spring-biassed latching means of any appropriate type which can be adapted to be simultaneously operated to an unlatched position by a steel cable as indicated in FIG. 3.

The described embodiment is only to be regarded as a non-restricting example, and a plurality of modifications are naturally possible within the scope of the inventive concept. For example, the telescopic joint may be accomplished by making the ends of the braces as sleeves telescopically accommodating horizontal guide members, and the telescopic connection may furthermore be located at the forward, instead of the rear, supports of the side frames. Neither is the structure limited to tubular members, and the axial displacement may be achieved in ways other than that described, which also applies to the locking means. The invention is thus solely restricted by the disclosures in the accompanying claims.

It will thus be understood that the invention provides a wheelchair of maximum compactness in a collapsed state, which is considerably less voluminous than the wheelchair chassis in previous implementations. By the simple and ingenious construction of the chassis in accordance with the invention, there is provided a robust, reliable and thoroughly thought-out design, which differs unconventionally from previously used constructional principles. By this design, reduction in the number of parts in a collapsible wheelchair chassis has been enabled, in comparison with such chassis in the prior art, making the inventive chassis advantageous from the weight aspect. Finally, the invention is also distinguished by the simplicity with which the chassis is taken from its collapsed to erected state and vice versa.

We claim:

1. Collapsible wheelchair chassis comprising; two side frames joined by a single pair of horizontally disposed cross braces; a pivot joint provided at the middle of said horizontally disposed braces; horizontally disposed guide sleeves in which said braces are slidable; a first set of axially indisplaceable vertically mounted sleeves, said first set of sleeves being pivotally mounted on a first set of stubs, said stubs comprising part of said side frames; and a second set of axially indisplaceable vertically mounted sleeves, said second set of sleeves being pivotally mounted on a second set of stubs, said second stubs also comprising part of said frame; wherein, a front end side of each brace of said pair of braces is rigidly attached to said first vertically mounted sleeves, a rear end of each brace of said pair of horizontal braces is telescopically displaceable in said horizontal guide sleeves, and said horizontal guide sleeves are rigidly connected to said second set of vertically mounted sleeves; said chassis further comprising locking devices disposed in each said horizontal guide sleeve to lock said chassis in an erected state.

2. Chassis as claimed in claim 1, characterized in that the locking device on each guide sleeve comprises a locking pin biassed by a spring to thrust into a hole in a respective brace rear end, via a bore in the guide sleeve, said hole being arranged directly opposite the guide sleeve bore in the erected state of the chassis.

3. Chassis as claimed in claim 2, characterized in that the locking pins of the locking devices are operable from their locking position with the aid of a common operating means.

4. Chassis as claimed in claim 3, characterized in that the operating means comprises an elongate, flexible means connecting the ends of the locking pins.

5. Chassis as claimed in claim 1, characterized in that backrest supports, attached to the side frames, may be swung forwards.

* * * * *